United States Patent
Zhang et al.

(10) Patent No.: US 11,614,581 B2
(45) Date of Patent: *Mar. 28, 2023

(54) POLARIZATION-MAINTAINING MULTI-CORE FIBER

(71) Applicant: YANGTZE OPTICAL FIBRE AND CABLE JOINT STOCK LIMITED COMPANY, Hubei (CN)

(72) Inventors: Xinben Zhang, Hubei (CN); Ming Tang, Hubei (CN); Chen Yang, Hubei (CN); Yue Meng, Hubei (CN); Kun Yang, Hubei (CN); Shen Peng, Hubei (CN); Chi Zhang, Hubei (CN); Weijun Tong, Hubei (CN)

(73) Assignee: YANGTZE OPTICAL FIBRE AND CABLE JOINT STOCK LIMITED COMPANY, Hubei (CN)

( * ) Notice: Subject to any disclaimer, the term of this patent is extended or adjusted under 35 U.S.C. 154(b) by 1 day.

This patent is subject to a terminal disclaimer.

(21) Appl. No.: 16/904,988

(22) Filed: Jun. 18, 2020

(65) Prior Publication Data
US 2020/0400876 A1     Dec. 24, 2020

(30) Foreign Application Priority Data
Jun. 20, 2019  (CN) .......................... 201910539222.3

(51) Int. Cl.
*G02B 6/24*   (2006.01)
*G02B 6/024*   (2006.01)
*G02B 6/02*   (2006.01)

(52) U.S. Cl.
CPC ......... *G02B 6/024* (2013.01); *G02B 6/02042* (2013.01)

(58) Field of Classification Search
CPC ........................... G02B 6/024; G02B 6/03694; G02B 6/02042; G02B 6/02085
See application file for complete search history.

(56) References Cited

U.S. PATENT DOCUMENTS 5,949,941 A * 9/1999 DiGiovanni ........... G02B 6/105
  385/127
10,018,796 B1 * 7/2018 Cook ..................... G02B 6/443
(Continued)

FOREIGN PATENT DOCUMENTS

CN   103399374 A   11/2013

*Primary Examiner* — Eric Wong
(74) *Attorney, Agent, or Firm* — Tim Tingkang Xia, Esq.; Locke Lord LLP

(57) ABSTRACT

A polarization-maintaining multi-core fiber includes a plurality of fiber core areas and a main outer cladding. The fiber core areas include one central fiber core area, and two or more than two outer fiber core areas equidistantly and uniformly arranged around the central fiber core area that is a polarization-maintaining fiber core area. Each outer fiber core area includes a fiber core and an inner cladding surrounding a core layer. A portion outside the fiber core areas is the main outer cladding. The fiber can greatly enhance spectral efficiency of an optical transmission system, and improve fiber communication capacity. The arrangement of the polarization-maintaining fiber core area provides a waveguide structure with a function of maintaining polarized light, which can be used for transmission of local light.

8 Claims, 3 Drawing Sheets

(56) References Cited

U.S. PATENT DOCUMENTS

| | | | |
|---|---|---|---|
| 2009/0060435 A1* | 3/2009 | Chen | G02B 6/024 385/123 |
| 2012/0219255 A1* | 8/2012 | Bradley | G02B 6/3885 385/78 |
| 2015/0307387 A1* | 10/2015 | Fagan | C03B 37/01231 65/412 |
| 2016/0209583 A1* | 7/2016 | Hayashi | G02B 6/3863 |
| 2016/0245989 A1* | 8/2016 | Suzuki | G02B 6/02319 |
| 2017/0219768 A1* | 8/2017 | Hayashi | G02B 6/02314 |
| 2017/0219774 A1* | 8/2017 | Kopp | G02B 5/3016 |
| 2017/0276867 A1* | 9/2017 | Kopp | G02B 6/02042 |

* cited by examiner

POLARIZATION-MAINTAINING MULTI-CORE FIBER

CROSS-REFERENCE TO RELATED APPLICATION

This application claims priority to and benefit of Chinese Patent Application No. 201910539222.3, filed Jun. 20, 2020 in the State Intellectual Property Office of P.R. China, which is hereby incorporated by reference in its entirety.

FIELD OF THE INVENTION

The present disclosure relates generally to the field of optical communication, and more particularly to a polarization-maintaining multi-core fiber.

BACKGROUND OF THE INVENTION

With the rise and popularization of large data volume services such as cloud computing, Internet of Things, high-definition televisions, virtual reality and the like, requirements for the transmission capability of fiber communication networks become increasingly higher. By using superchannel multiplexing technologies, the capacity of a single fiber can be increased to above 100 Tb/s, which is close to the Shannon theorem limit of a single fiber. There is thus an urgent need for in-depth researching and developing of ultra-large-capacity fiber communication technologies of high spectral efficiency so as to address the problem of further expanding fiber communication networks. Space division multiplexing (SDM) technologies provide a plurality of independent physical channels for parallel data transmission by using multi-core fibers (MCFs) or few-mode fibers (FMFs) or even multi-core/few-mode combined new type fibers, and can, in conjunction with self-coherent detection, greatly enhance the spectral efficiency of optical transmission systems, improve fiber communication capacity, and reduce cost. SDM technology is therefore considered to be an effective approach to address capacity crisis of single-mode fibers. Compared with larger inter-mode dispersion or inter-mode crosstalk present in few-mode fibers, inter-core crosstalk in multi-core fibers is easier to control. Multi-core fibers are therefore more advantageous in interconnection density, capacity expansibility, and transmission distance. A multi-core fiber based homologous homodyne self-coherent optical communication system can fully exert the advantage of high spectral efficiency of coherent optical communication, and meanwhile simplify DSP process to significantly reduce power consumption. The multi-core fiber based homologous homodyne self-coherent optical communication system is hence a competitive solution for realizing data center interconnection at a rate of 800 Gbps and above across a single wave in a short distance.

In multi-core fiber based self-coherent detection, a fiber typically does not have a polarization-maintaining function (for example, patent CN103399374A), and in practical use, evolution of a polarization state of the fiber is random, which requires additional use of an automatic polarization controller to track the polarization state of local light so as to control polarization of the local light transmitted to a receiving end. This increases power consumption and complexity of the system, and increases processing latency.

SUMMARY OF THE INVENTION

An technical problem to be solved by the present disclosure is directed against the above described deficiencies in the existing technologies, and the present disclosure aims to provide a polarization-maintaining multi-core fiber which can effectively enhance certainty of a polarization state of local light, improve reliability of a system, decrease photo-electric devices on a receiving end, reduce complexity of DSP, to thereby decrease cost of the system.

In order to solve the above technical problem, the present disclosure in one aspect discloses a polarization-maintaining multi-core fiber including a plurality of fiber core areas and a main outer cladding. The plurality of fiber core areas includes one central fiber core area, and two or more than two outer fiber core areas equidistantly and uniformly arranged around the central fiber core area. The central fiber core area is a polarization-maintaining fiber core area. The outer fiber core areas each include a fiber core and an inner cladding surrounding a core layer. A portion outside the fiber core areas is the main outer cladding.

In certain embodiments, provided are one to two layers of the outer fiber core areas, and each of the layers is provided with two or more than two equidistantly and uniformly arranged outer fiber core areas, the outer fiber core areas in each of the layers being equidistantly arranged from the central fiber core area.

In certain embodiments, provided is one layer of the outer fiber core areas, and each layer is provided with three to eight equidistantly and uniformly arranged outer fiber core areas.

In certain embodiments, the polarization-maintaining fiber core area includes a polarization-maintaining fiber core having a cross-section of a round shape and a polarization-maintaining inner cladding, and the polarization-maintaining fiber core area is provided symmetrically on two sides thereof with stress units (areas).

In certain embodiments, the stress units each have a cross-section of a round shape or an arc block shape.

In certain embodiments, the polarization-maintaining fiber core area includes a polarization-maintaining fiber core layer having a cross-section of a round shape and a polarization-maintaining inner cladding having a cross-section of an oval shape.

In certain embodiments, the polarization-maintaining fiber core area includes a polarization-maintaining fiber core layer having a cross-section of an oval shape and a polarization-maintaining inner cladding having a cross-section of an oval shape.

In certain embodiments, the fiber core of each of the outer fiber core areas has a step refractive index; the fiber core has a diameter of 5-15 µm; and a relative refractive index difference between the fiber core and the main outer cladding is 0.15%-0.45%.

In certain embodiments, the fiber core has a graded refractive index which is represented as $n(r)=n_0 \cdot [1-2\Delta(r/a)^m]^{0.5}$, $0 \leq r \leq a$, wherein a radius a of the fiber core is 2.5-25 µm; a relative refractive index difference $\Delta$ between a geometric center of the fiber core and the main outer cladding is 0.20%-1.50%; a characteristic parameter m is 1.5-2.5; r is a distance from any point on the fiber core to the geometric center; and $n_0$ is a refractive index at the geometric center of the fiber core.

In certain embodiments, a relative refractive index difference between the inner cladding and the main outer cladding is −0.5%-0.05%; the inner cladding has a unilateral thickness of 1-10 µm; and the main outer cladding is a pure silica glass layer.

In certain embodiments, the fiber core and the inner cladding are provided therebetween with a transitional inner cladding. A ratio of a diameter of the transitional inner cladding to a diameter of the fiber core is 1.0-3.0; the transitional inner cladding is a pure silica glass layer.

In certain embodiments, polarization crosstalk at an operating wavelength of the polarization-maintaining fiber core area within 1000 m is not lager than −10 dB.

In certain embodiments, the main outer cladding contains a reference line extending along a length direction of the fiber. The reference line is located at an asymmetric portion of the fiber core areas of the multi-core fiber.

The present disclosure brings the following beneficial effects. 1. The multi-core fiber provides a plurality of independent physical channels for parallel data transmission, and can, in conjunction with self-coherent detection, greatly enhance the spectral efficiency of an optical transmission system, improve fiber communication capacity, and reduce cost. 2. The arrangement of the polarization-maintaining fiber core area provides a waveguide structure with a function of maintaining polarized light, which can be used for transmission of local light. On the occasion of high capacity access networks or data center interconnection using self-coherent detection, the present disclosure can enhance certainty of polarization of local light, save automatic polarization controllers, reduce complexity of photoelectric devices and DSP on a receiving end, significantly decrease system latency, and thus reduce cost. 3. Providing the polarization-maintaining fiber core at the center of the fiber can reduce external interference and facilitate connecting.

DETAILED DESCRIPTION OF THE EMBODIMENTS

The present disclosure is further described in detail below in conjunction with embodiments.

Figure 1:
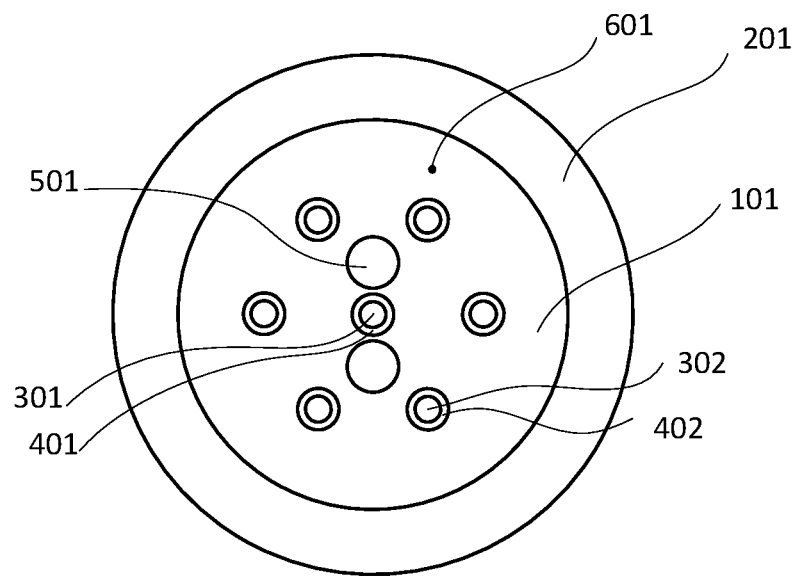
FIG. 1 is a cross-sectional structural view of a first embodiment of the present disclosure.

A first embodiment is as shown in FIG. 1. A polarization-maintaining multi-core fiber includes seven fiber core areas and a main outer cladding 101. The seven fiber core areas include one central fiber core area and six outer fiber core areas equidistantly and uniformly arranged around the central fiber core area. The six outer fiber core areas form a layer of outer fiber core areas. The central fiber core area is a polarization-maintaining fiber core area. The polarization-maintaining fiber core area includes a polarization-maintaining fiber core 301 having a cross-section of a round shape and a polarization-maintaining inner cladding 401. The polarization-maintaining fiber core area is provided symmetrically on two sides thereof with stress units 501. The stress units are located between the outer fiber core areas and the central fiber core area, and two outer fiber core areas adjacent to each of the stress units are symmetrical. The stress units each have a cross-section of a round shape, and the stress units are boron-doped stress units. A boron-doped stress area has a diameter of 20 µm. A core distance between the boron-doped stress area and the polarization-maintaining fiber core is 20 µm. The boron-doped stress area has a molar concentration of doped boron of 20%. Polarization crosstalk at the polarization-maintaining fiber core is −20 dB within 1000 m. The outer fiber core areas have core claddings of a same structure, including a fiber core 302 and an inner cladding 402 surrounding a core layer. A portion outside the fiber core area is the main outer cladding. The fiber core has a step refractive index. The fiber core has a diameter of 9 µm. A relative refractive index difference between the fiber core and the main outer cladding is 0.40%. A relative refractive index difference between the inner cladding and the main outer cladding is −0.05%. The inner cladding has a unilateral thickness of 2.5 µm. The main outer cladding is a pure silica glass layer, and has a diameter of 150 µm. The polarization-maintaining fiber core and the polarization-maintaining inner cladding have structures the same as the structure of the core cladding of the above described outer fiber core areas. The main outer cladding contains a reference line 601 extending along a length direction of the fiber. The reference line has a diameter of 1 µm. The reference line is located outside the outer fiber core areas and at an asymmetric portion of the outer fiber core areas. The main outer cladding is coated with a coating layer 201 of resin. The resin is acrylic resin, and the coating layer has a diameter of 245 µm.

Figure 2:
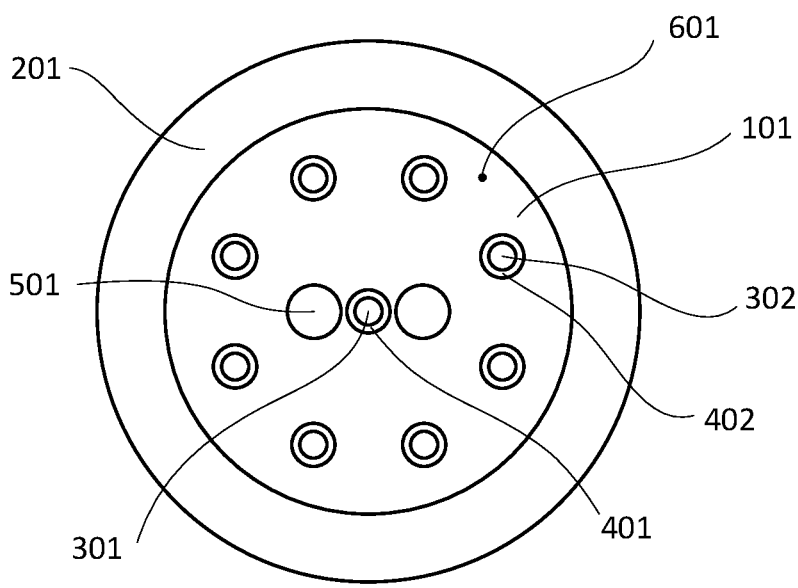
FIG. 2 is a cross-sectional structural view of a second embodiment of the present disclosure.

A second embodiment is as shown in FIG. 2. The second embodiment is different from the first embodiment in that the polarization-maintaining multi-core fiber of the second embodiment includes eight outer fiber core areas equidistantly and uniformly arranged around the central fiber core area. Other structures are the same as those described in the first embodiment.

Figure 3:
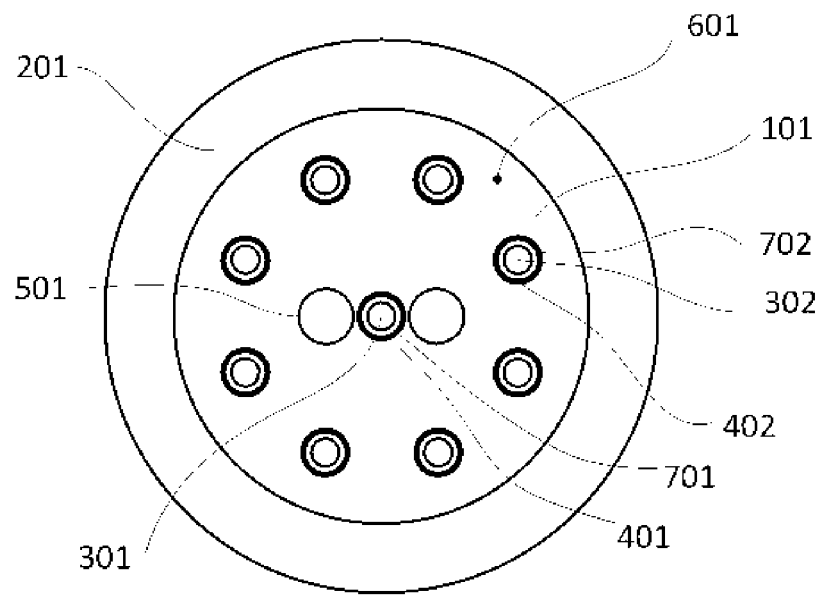
FIG. 3 is a cross-sectional structural view of a third embodiment of the present disclosure.

A third embodiment is as shown in FIG. 3. The third embodiment is different from the second embodiment in the following. The fiber core and the inner cladding are provided therebetween with a transitional inner cladding 702. The transitional inner cladding 702 has a diameter of 16 µm, and is a pure silica glass layer. The inner cladding layer has a diameter of 24 µm. Besides, the polarization-maintaining fiber core 301 and the polarization-maintaining inner cladding 401 are provided therebetween with a polarization-maintaining transitional inner cladding 701. The polarization-maintaining inner cladding and the polarization-maintaining transitional inner cladding have structures the same as those of the above described inner cladding and transitional inner cladding. Other structures in this embodiment are the same as those described in the first embodiment.

Figure 4:
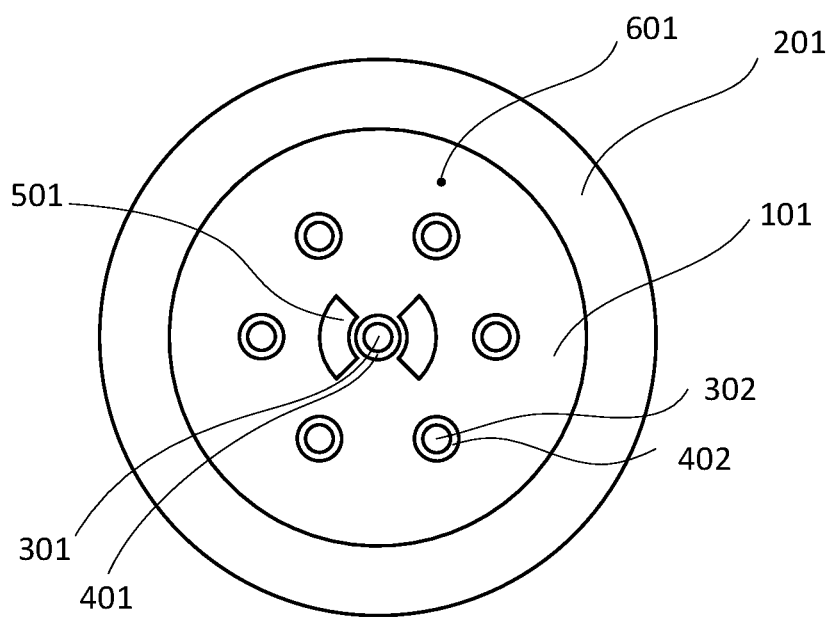
FIG. 4 is a cross-sectional structural view of a fourth embodiment of the present disclosure.

A fourth embodiment is as shown in FIG. 4. The fourth embodiment is different from the first embodiment in the following. The boron-doped stress area is of an arc block shape (bowtie shape). The arc block has an inner radius of 20 µm and an outer radius of 42 µm, and an angel between two side edges thereof of 90°, namely a radian of π/2. The boron-doped stress area is located on two sides of the polarization-maintaining fiber core. The boron-doped stress area has a molar concentration of doped boron of 20%. The stress units are located between the outer fiber core areas and the central fiber core area, aligning right to an outer fiber core area adjacent thereto. The polarization crosstalk at the polarization-maintaining fiber core is −24 dB within 1000 m. Other structures are the same as those described in the first embodiment.

Figure 5:
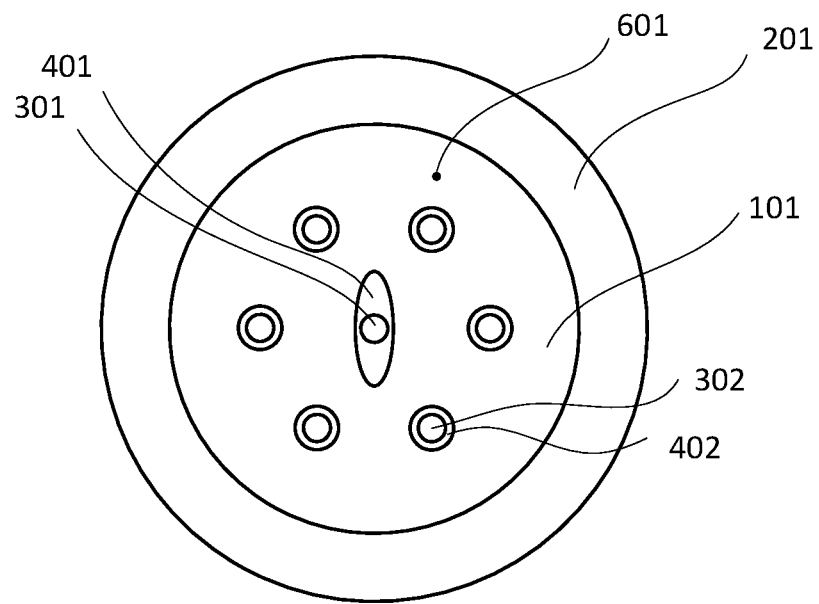
FIG. 5 is a cross-sectional structural view of a fifth embodiment of the present disclosure.

A fifth embodiment is as shown in FIG. 5. The fifth embodiment is different from the first embodiment in the following. The polarization-maintaining fiber core 301 is of a round shape, and has a diameter of 9 µm. The relative refractive index difference between the polarization-maintaining fiber core and the main outer cladding is 1.0%. The polarization-maintaining inner cladding 401 is of an oval shape having a long axis of 42 µm and a short axis of 14 µm. The relative refractive index difference between the polarization-maintaining inner cladding and the main outer cladding is 0.5%. The polarization crosstalk at the polarization-maintaining fiber core is −18 dB within 1000 m. The coating layer is a polyimide coating layer. A long-time tolerable temperature of the fiber is 150° C. Other structures are the same as those described in the first embodiment.

Figure 6:
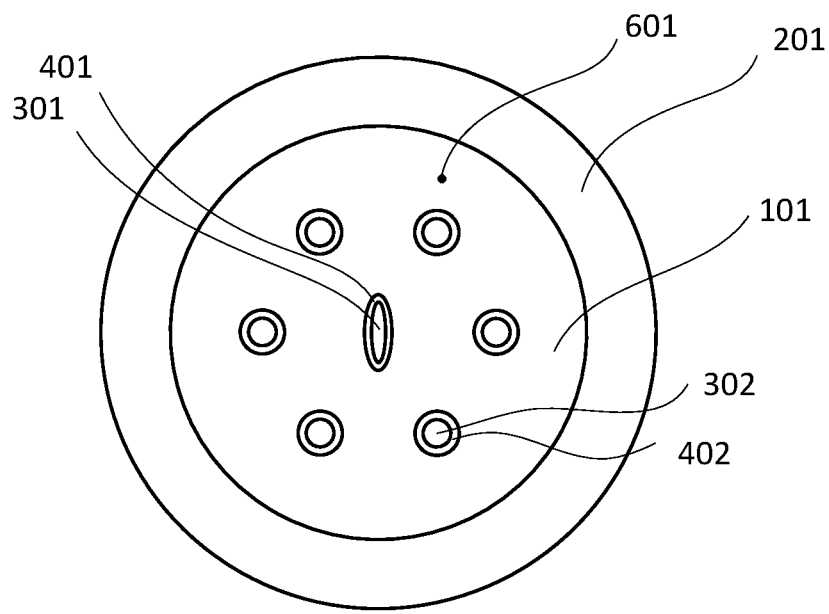
FIG. 6 is a cross-sectional structural view of a sixth embodiment of the present disclosure.

A sixth embodiment is as shown in FIG. 6. The sixth embodiment is different from the third embodiment in the following. The polarization-maintaining fiber core 301 is of an oval shape having a short axis of 5 µm and a long axis of 22 µm. The polarization-maintaining inner cladding 401 is of an oval shape having a short axis of 10 µm and a long axis of 27 µm. The relative refractive index difference between the polarization-maintaining fiber core and the main outer cladding is 0.40%. The relative refractive index difference between the polarization-maintaining inner cladding and the main outer cladding is −0.05%. The polarization crosstalk at the polarization-maintaining fiber core is −18 dB within 1000 m. The coating layer is an acrylic resin coating layer. Other structures are the same as those described in the first embodiment.

Accordingly, the fiber can greatly enhance spectral efficiency of an optical transmission system, and improve fiber communication capacity. The arrangement of the polarization-maintaining fiber core area provides a waveguide structure with a function of maintaining polarized light, which can be used for transmission of local light. On the occasion of high capacity access networks or data center interconnection using self-coherent detection, the fiber can enhance certainty of polarization of local light, save automatic polarization controllers, reduce complexity of photoelectric devices and DSP on a receiving end, significantly decrease system latency, and thus reduce cost.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

What is claimed is:

1. A polarization-maintaining multi-core fiber, comprising:
   a plurality of fiber core areas and a main outer cladding surrounding the plurality of fiber core areas,
   wherein the plurality of fiber core areas includes one central fiber core area, and two or more than two outer fiber core areas equidistantly and uniformly arranged around the central fiber core area, each outer fiber core area being equidistantly arranged from the central fiber core area;
   wherein the central fiber core area is a polarization-maintaining fiber core area including a polarization-maintaining fiber core and a polarization-maintaining inner cladding surrounding the polarization-maintaining fiber core, wherein two stress units are symmetrically provided on two sides of the polarization-maintaining fiber core area, and each of the stress units is a boron-doped stress area and has a cross-section of a round shape, wherein a core distance between one of the stress units and the polarization-maintaining fiber core is 20 µm;
   wherein each of the outer fiber core areas includes a fiber core and an inner cladding surrounding the fiber core; and
   wherein a relative refractive index difference between the inner cladding and the main outer cladding is −0.5%-0.05%.

2. The polarization-maintaining multi-core fiber according to claim 1, wherein the outer fiber core areas are arranged in one to three layers, and each of the layers is provided with two or more than two equidistantly and uniformly arranged outer fiber core areas, the outer fiber core areas in each of the layers being equidistantly arranged from the central fiber core area.

3. The polarization-maintaining multi-core fiber according to claim 1, wherein the fiber core of each of the outer fiber core areas has a step refractive index; the fiber core has a diameter of 5-15 µm; and a relative refractive index difference between the fiber core and the main outer cladding is 0.15%-0.45%.

4. The polarization-maintaining multi-core fiber according to claim 1, wherein the fiber core has a graded refractive index which is represented as $n(r)=n_0 \cdot [1-2\Delta(r/a)^m]^{0.5}$, $0 \leq r \leq a$, wherein a radius a of the fiber core is 2.5-25 µm; a relative refractive index difference $\Delta$ between a geometric center of the fiber core and the main outer cladding is 0.20%-1.50%; a characteristic parameter m is 1.5-2.5; r is a distance from any point on the fiber core to the geometric center; and no is a refractive index at the geometric center of the fiber core.

5. The polarization-maintaining multi-core fiber according to claim 1, wherein the inner cladding has a unilateral thickness of 1-10 µm; and the main outer cladding is a pure silica glass layer.

6. The polarization-maintaining multi-core fiber according to claim 5, wherein the fiber core and the inner cladding are provided therebetween with a transitional inner cladding, wherein a ratio of a diameter of the transitional inner cladding to a diameter of the fiber core is 1.0-3.0; the transitional inner cladding is a pure silica glass layer; and polarization crosstalk at an operating wavelength of the polarization-maintaining fiber core area within 1000 m is not lager than −10 dB.

7. The polarization-maintaining multi-core fiber according to claim 1, wherein the boron-doped stress area has a molar concentration of doped boron of 20%.

8. The polarization-maintaining multi-core fiber according to claim 1, wherein the boron-doped stress area has a diameter of 20 µm.

* * * * *